United States Patent [19]

Sasayama et al.

[11] 4,334,186
[45] Jun. 8, 1982

[54] APPARATUS FOR DRIVING HOT-WIRE TYPE FLOW SENSOR

[75] Inventors: Takao Sasayama; Shinichi Sakamoto, both of Hitachi, Japan

[73] Assignee: Hitachi, Ltd., Tokyo, Japan

[21] Appl. No.: 192,994

[22] Filed: Oct. 2, 1980

[30] Foreign Application Priority Data

Oct. 3, 1979 [JP] Japan ................................. 54-126786
Oct. 3, 1979 [JP] Japan ................................. 54-126789

[51] Int. Cl.³ ............................................ F02M 51/00
[52] U.S. Cl. .................................... 323/365; 323/283; 307/353; 123/494
[58] Field of Search ............... 323/282, 283, 352, 353, 323/364–367, 369; 307/352, 353; 324/105, 106, DIG. 1; 73/362 AR; 123/484, 494

[56] References Cited

U.S. PATENT DOCUMENTS

| 3,602,826 | 8/1971 | List et al. | 307/353 |
| 3,605,008 | 9/1971 | Shoemaker | 323/365 |
| 3,796,198 | 3/1974 | Mauch et al. | 123/494 |
| 3,943,434 | 3/1976 | Haeusler et al. | 323/366 |
| 4,028,642 | 6/1977 | Kushida et al. | 323/366 |
| 4,058,089 | 11/1977 | Schmidt et al. | 123/494 |
| 4,143,550 | 3/1979 | Kobayashi | 323/366 |

FOREIGN PATENT DOCUMENTS 1397113 6/1975 United Kingdom .

Primary Examiner—William M. Shoop
Assistant Examiner—Peter S. Wong
Attorney, Agent, or Firm—Craig and Antonelli

[57] ABSTRACT

An apparatus for driving a hot-wire air-flow sensor of constant temperature difference type includes a hot wire and a temperature sensitive compensating element such as a resistor for compensating temperature of air. The hot wire and the resistor are formed of identical elements. A pulse train signal having a pulse width varying in correspondence to difference between voltage drops produced, respectively, across the hot wire and the compensating resistor supplied with a constant current is produced for interrupting the current supplied to the hot wire.

12 Claims, 9 Drawing Figures

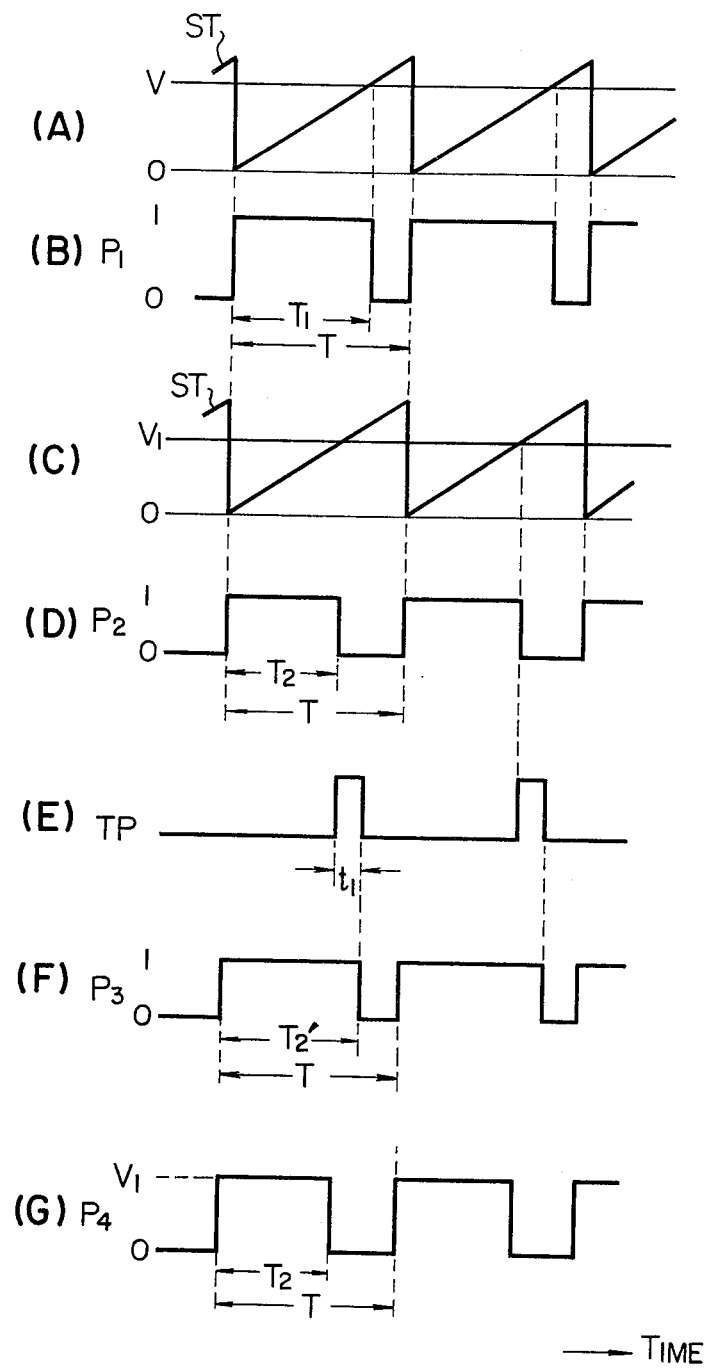

APPARATUS FOR DRIVING HOT-WIRE TYPE FLOW SENSOR

BACKGROUND OF THE INVENTION

The present invention relates generally to an intake air flow measuring apparatus for an internal combustion engine. In particular, the invention concerns a driver apparatus for a hot-wire type air flow sensor for the internal combustion engine.

DESCRIPTION OF THE PRIOR ART

In general, the measurement of air flow or flow rate by means of a hot-wire type air-flow sensor makes use of a non-linear relationship between a heat loss of the hot wire and the air flow rate. Heretofore, there has been widely adopted a so-called constant temperature difference type analog driving system in which a bridge circuit such as one shown in FIG. 1 is employed. More specifically, a bridge circuit 20 composed of fixed resistors 3 and 4, a variable resistor 5 and a hot wire 6 is supplied with A.C. power from an A.C. power supply source 1 through a semiconductor switch 2, as is shown in FIG. 1. A terminal which is located in diametrical opposition to the A.C. power input terminal is connected to the ground. A differential amplifier 7 is connected to signal output terminals of the bridge circuit 20 and serves to amplify a differential voltage which appears across the output terminals of the bridge circuit 20 when the latter becomes unbalanced. The output of the differential amplifier is coupled to a low-pass filter 8 the output of which in turn is connected to one input of a comparator 9. The other input of the comparator 9 is supplied with a reference voltage signal of a triangular waveform from an integrator circuit 11 the input of which is connected to a pulse generating oscillator 10 and which serves for producing the triangular reference voltage signal by integrating the pulses of a predetermined duration generated by the pulse oscillator 10. The output signal from the lowpass filter 8 representative of the differential voltage signal output from the bridge circuit 20 is compared with the triangular reference voltage signal output from the integrator circuit 11 through the comparator 9. When the triangular reference voltage signal is higher than the differential voltage signal, a signal of "HIGH" level is produced from the comparator 9. On the other hand, when the triangular reference voltage is lower than the differential voltage signal, a signal of "LOW" level is produced from the comparator 9. The output signal from the comparator 9 is supplied to a pulse power amplifier 12 which is so adapted that the duty cycle thereof is determined on the basis of the output signal from the comparator 9. The power amplifier 12 thus produces a signal for closing or opening the semiconductor switch 2 in dependence on the duty cycle thus determined. Further, the output signals from the low-pass filter 8 and the pulse power amplifier 12 derived from the respective output terminals OUT 1 and OUT 2 are supplied to an electronic computer to be arithmetically processed for obtaining quantities utilized for controlling the ignition timing of the associated engine, fuel supply thereto or the like.

In the hot-wire type air flow sensor of the arrangement described above, a heat transfer quantity between the hot wire placed in the air flow and air is of the following relationship to a mass flow $Q_A$ (precisely, a flow rate determined in consideration of density of air and represented as the mass flow on the assumption that the cross-sectional area of flow is constant).

That is, $$K = C_1 + C_2\sqrt{Q_A} \qquad (1)$$

where
- $C_1 = K \cdot A \cdot a$
- $C_2 = K \cdot A \cdot b$
- K: heat transfer coefficient between the hot wire and air
- A: surface area of the hot-wire, and
- a, b: constants.

The method for measuring the flow or flow rate by making use of the relation stated above has long been established and adopted in the flowmeter and the current meter. When the electric power or energy supplied to the hot wire is balanced with the heat transfer quantity to air, the following relation applies valid.

$$I^2 R_H / 4.2 = (C_1 + C_2\sqrt{Q_A})(T_H - T_a) \qquad (2)$$

where
- $T_H$ represents temperature of the hot wire,
- $T_a$ represents temperature of air,
- $R_H$ represents resistance of the hot-wire, and
- I represents an electric current flowing through the hot-wire.

In order to detect the flow or flow rate $Q_A$ as a function of only the current I, it is desirable that the term $(T_H - T_a)$ in the expression (2), i.e. the difference in temperature between the hot wire and ambient air should be constant, which is also advantageous in that change in the heat transfer coefficient can be suppressed to a possible minimum. Under the circumstances, measures to this end are widely adopted at present. More specifically, the hot wire is inserted in one branch of the bridge circuit, while a temperature-sensitive resistor of a same material as that of the hot wire is inserted in the other branch of the bridge circuit, wherein the voltage applied to the bridge is so controlled that the bridge circuit remains in the balanced condition. For measuring the heat quantity as supplied, it is required to detect the current I which should subsequently be squared. Further, in order to determine the flow rate $Q_A$, it is necessary to multiply the squared current ($I^2$) with the resistance $R_H$ of the hot wire, the resulting product being subsequently squared, as can be seen from the expression (2). In other words, for determining the flow rate $Q_a$, a biquadratic value of the current I has to be determined, even when the temperature of the hot wire and hence the resistance $R_H$ thereof is maintained to be constant.

In the operation of the hitherto known hot-wire type air flow sensor described above, the signal representative of the flow rate is detected as a value of electric current. Accordingly, when the hot-wire type air flow sensor is to be combined with a digital control system for the internal combustion engine incorporating a microprocessor, there is required an analog-to-digital converter means of some kind. Further, the intake air flow fed to the engine is accompanied by cyclical variations in synchronism with the strokes of the pistons of the engine and undergoes disadvantageously remarkable variation particularly at a low speed operation and a high load operation.

Additionally, since the output signal from the hot-wire type air flow sensor characteristically exhibits a non-linearity relative to the air flow rate, it is required to linearize the sensor output signal. However, such linearization will encounter difficulty, because the sensor output signal is obtained in a form of biquadratic value of the current I, as described above. Further, averaging the output signal from the sensor which undergoes variations for the reasons described above as well as delaying the response of the sensor will undesirably involve errors in the measurement.

As another hitherto known air-flow meter, it is disclosed in British Pat. No. 1,397,113 that a thermistor is incorporated in a branch of a bridge circuit, whereby the quantity of heat emitted from the thermistor is detected to thereby determine the air flow rate through appropriate signal processings. However, this prior patent teaches no means for reducing the arithmetic operations to be executed by an electronic computer. By the way, U.S. Pat. Nos. 3,796,198 and 4,058,089 suggest means for reducing the load imposed on the computer for processing the signal output from the air-flow sensor. However, the sensor disclosed in both of U.S. Patents comprises the hot wire and a resistor for temperature compensation incorporated in a resistor bridge circuit. In this connection, it should be noted that the temperature compensating resistor made of the same material as that of the hot wire and having substantially the same resistance as that of the latter will generate heat (spontaneous heat generation), making it difficult to detect the air flow rate with a high accuracy. Of course, the heat generation of the temperature compensating resistor may be evaded by selecting a high resistance value for the compensating resistor. However, then the volume of the temperature compensating resistor will be considerably increased to a disadvantage.

SUMMARY OF THE INVENTION

An object of the invention is therefor to provide an apparatus for driving a hot-wire type air-flow sensor which can measure an air flow rate with an improved accuracy and which is capable of reducing a load imposed on an electronic computer for processing the sensor signal.

In view of the above and the other objects which will become more apparent as description proceeds, it is proposed according to an aspect of the invention that a sampled and held value of a voltage drop produced across a hot wire having a resistance value which varies in accordance with an electric current flow through the wire is compared with a voltage appearing across a temperature sensitive compensating element with the resultant voltage difference being integrated. The integrated voltage value is then compared with a voltage output from a saw tooth generator. On the basis of the result obtained from the second comparison, a duty cycle with which the duration of a constant current flowing through the hot wire is controlled is so varied that the difference between the temperature of the hot wire and the ambient temperature detected by the temperature compensating resistor is maintained to be constant.

BRIEF DESCRIPTION OF THE DRAWINGS

FIGS. 6a and 6b are signal waveform diagrams to illustrate operations of the apparatus shown in FIGS. 2 and 5.

DESCRIPTION OF THE PREFERRED EMBODIMENTS

Figure 2:
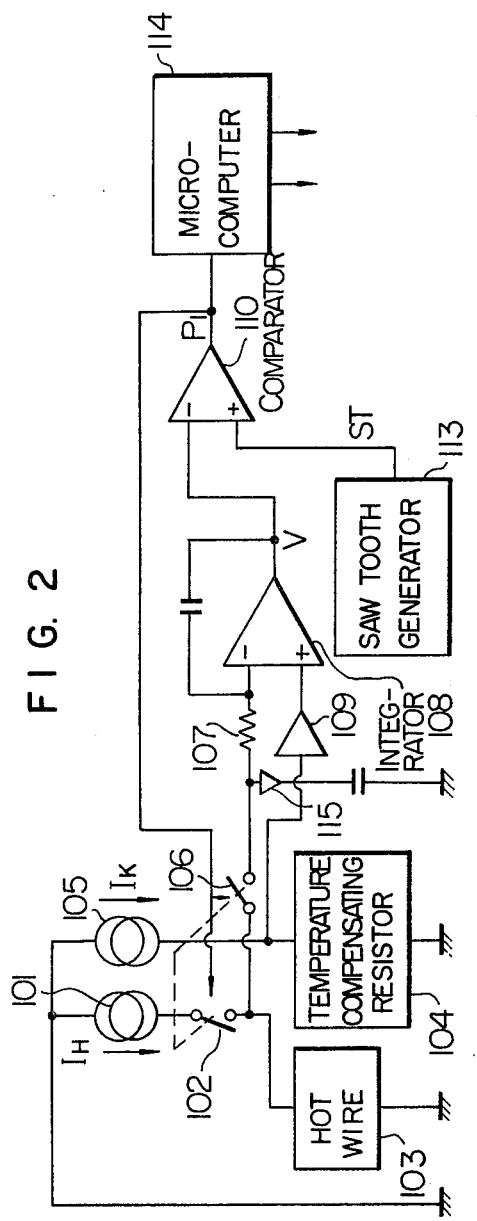
FIG. 2 shows in a block diagram an arrangement of an apparatus for driving a hot-wire type air-flow sensor according to an embodiment of the invention.

Referring to FIG. 2 showing an exemplary embodiment of the invention, reference numeral 101 denotes a constant current supply source having one end connected to the ground and the other end which is connected to a hot wire 103 through a semiconductor switch device 102. The constant current source 101 is adapted to supply a constant current $I_H$ to the hot-wire 103 through the semiconductor switch 102. A series connection of a temperature compensating resistor 104 for detecting the ambient temperature and a constant current source 105 for supply a constant current $I_K$ to the temperature compensating resistor 104 is connected in parallel with the series connection of the constant current source 101, the semiconductor switch 102 and the hot wire 103.

The other end of the hot wire 103 is further connected to a resistor 107 through a semiconductor switch 106 which is interlocked with the semiconductor switch 102. The resistor 107 has the other end connected to a negative input terminal of an integrator circuit 108. The junction between the constant current source 105 and the temperature compensating resistor 104 is connected to a positive input terminal of the integrator circuit 108 through an amplifier 109. The integrator circuit 108 thus serves for integrating the difference between the terminal voltages produced across the hot wire 103 and the temperature compensating resistor 104, respectively. The output of the integrator circuit 108 is connected to a negative input terminal of a comparator 110. The junction between the semiconductor switch 106 and the resistor 107 is connected to the input of a buffer amplifier 115 having the output connected is grounded through a capacitor 112.

Reference numeral 110 denotes a saw tooth generator having an output connected to a positive input terminal of the comparator 110. The comparator serves thus for comparing the output voltage from the integrator circuit 108 with the output voltage from the saw tooth generator 113. When the saw tooth voltage output from the saw tooth generator 113 is higher than the output voltage from the integrator circuit 108, the comparator 110 produces an output signal of "HIGH" level. On the other hand, when the saw tooth voltage is lower than the output voltage from the integrator circuit 108, the output signal from the comparator 110 is of "LOW" level. In other words, the comparator 110 produces a pulse signal which rises up at an intersection between the saw tooth voltage and the output voltage from the integrator circuit 108 and has a duration corresponding to a period during which the saw tooth voltage remains higher than the voltage output from the integrator 108. In this manner, the duty factor or ratio of the signal for controlling both the semiconductor switches 102 and 106 simultaneously is determined by the comparator 110. A microcomputer 114 is also connected to the output of the comparator 110 whereby a signal representative of the air flow rate is derived from the output signal of the comparator circuit 110 to be utilized for controlling the ignition timing and fuel supply to the engine.

With the arrangement described above, when the semiconductor switch 102 is turned on, a pulse-like constant current is fed to the hot wire 103. Since the switch 106 is interlocked with the switch 102, the former is closed simultaneously with the latter. As the consequence, a voltage drop produced due to the resistance of the hot wire 103 is sampled and held in the capacitor 112 through the buffer amplifier 115. The value of the sampled voltage is compared with the terminal voltage appearing across the temperature compensating resistor 104 upon flowing of the constant current $I_K$, the resultant difference being integrated to obtain a voltage V of a waveform shown in FIG. 6a at (A). The voltage V output from the integrator circuit 108 is compared with the saw tooth voltage ST (refer to FIG. 6a at (A)) produced from the saw tooth generator 113, whereby the pulse signal $P_1$ having a duty ratio of $T_1/T$ is obtained (refer to FIG. 6a at (B)). The switches 102 and 106 are driven or controlled by this pulse signal $P_1$. The period of the saw tooth voltage is constant, while the duty ratio is varied.

Assuming now that the air flow is increased with the quantity of heat loss at the hot wire being correspondingly increased, the resistance value $R_H$ will be decreased because of the hot wire being cooled, resulting in that the voltage drop caused by the resistance $R_H$ of the hot wire becomes lower as compared with the voltage drop produced across the temperature compensating resistor 104 having the resistance value $R_K$. As the consequence, the output voltage from the integrator circuit 113 will be correspondingly lowered, whereby the duration or pulse width of the output pulse from the comparator is increased, which means that the period during which the switches 102 and 106 are closed is lengthened to thereby increase correspondingly the flowing duration of the current $I_H$. In this way, the heat quantity generated by the hot wire is increased, whereby the temperature of the hot wire is prevented from being lowered. Thus, the hot wire is maintained at a constant temperature.

The balancing conditions described above can be expressed by the following expressions on the assumption that both the hot wire and the temperature compensating resistor are made of a same material and that the temperature coefficient of resistance of them can be approximated by a linear function. That is, $$R_H = R_{HO}(1 + \alpha \cdot T_H) \tag{3}$$

$$R_K = R_{KO}(1 + \alpha \cdot T_a) \tag{4}$$

where
$R_{HO}$: value of $R_H$ when $T_H = 0$,
$R_{KO}$: value of $R_K$ when $T_a = 0$, and
$\alpha$: temperature coefficient of resistance.

The power supplied to the hot wire exhibiting the resistance $R_H$ is given by a product of the resistance $R_H$ and the squared effective value (RMS value) of the pulse current $i_H$ flowing through the hot wire, as can be seen from expression (6) stated below. More specifically, the effective value $i_{H(RMS)}$ of the current $i_H$ can be expressed as follows.

$$i_{H(RMS)} = \sqrt{\frac{1}{T} \int_0^T i_H^2 \cdot dt} \tag{5}$$

$$= \sqrt{\frac{1}{T} \left( \int_0^{T_1} i_H^2 \cdot dt + \int_{T_1}^T 0 \cdot dt \right)}$$

$$= I_H \sqrt{\frac{T_1}{T}}$$

$$= I_H \sqrt{D}$$

where
T: period of the pulse current,
$T_1$: duration of the pulse curent, and
D: duty ratio of the pulse current.

Accordingly, the power supplied to the hot wire is expressed as follows:

$$W_H = R_H \cdot i_H^2(RMS) \tag{6}$$

$$= R_{HO}(1 + \alpha T_H) \cdot I_H^2 \cdot D$$

Since the value of the voltage drop produced across the hot wire and the amplified value of the voltage drop produced across the temperature compensating resistor are balanced with each other, $$R_{HO}(1+\alpha T_H) \cdot T_H = K \cdot R_{KO}(1+\alpha T_a)I_K \tag{7}$$

where K represents the amplification factor for the voltage drop at the temperature compensating resistor. Accordingly, $$T_H - T_a = \frac{1}{\alpha}\left(1 - \frac{R_{HO} \cdot I_H}{K \cdot R_{KO} \cdot I_K}\right)(1 + \alpha T_H) \tag{8}$$

$$= \frac{1}{\alpha}\left(\frac{K \cdot R_{KO} \cdot I_K}{R_{HO} \cdot I_H} - 1\right)(1 + \alpha T_a)$$

From the expressions (6) and (8), the expression (2) stated hereinbefore can be rewritten as follows.

$$\frac{R_{HO}(1 + \alpha T_H) \cdot I_H^2 \cdot D}{4.2} = \tag{9}$$

$$(C_1 + C_2 \sqrt{Q_A}) \cdot \frac{1}{\alpha}\left(1 - \frac{R_{HO} \cdot I_H}{K \cdot R_{KO} \cdot I_K}\right) \cdot (1 + \alpha T_H)$$

-continued $$D = \frac{4.2}{R_{HO} \cdot I_H^2 \cdot \alpha}\left(1 - \frac{R_{HO} \cdot I_H}{K \cdot R_{KO} \cdot I_K}\right)(c_1 + c_2\sqrt{Q_A}) \quad (10)$$

$$= C_1 + C_2\sqrt{Q_A}$$

where $$C_1 = \frac{4.2}{R_{HO} \cdot I_H^2 \cdot \alpha}\left(1 - \frac{R_{HO} \cdot I_H}{K \cdot R_{KO} \cdot I_K}\right)c_1, \text{ and}$$

$$C_2 = \frac{4.2}{R_{HO} \cdot I_H^2 \cdot \alpha}\left(1 - \frac{R_{HO} \cdot I_H}{K \cdot R_{KO} \cdot I_K}\right)c_2$$

Since $R_{HO}$, $R_{KO}$, $I_H$, $I_K$, $K$ and $\alpha$ are constants, $C_1$ and $C_2$ are also constants. The duty ratio D of the pulse current is expressed as a linear function of the square root of the air flow rate $Q_A$ independently from the ambient temperature or the air temperature $T_a$. Accordingly, the air flow or flow rate can be measured by determining the duty ratio.

Because the duty ratio D is determined as the linear function of the square root of the air flow $Q_A$, the latter can be determined through squaring operation which is executed by the microcomputer 114 in such manner that the difference $(D - C_1)$ is determined and subsequently squared for determining the flow quantity $Q_A$.

As will be appreciated from the above elucidation, the air flow signal is detected as the duty ratio. Accordingly, no converting means such as A-D converter is required for coupling the air flow sensor driving system to a digital control system for engine incorporating a microprocessor.

In the case of the embodiment of the invention described below, the hot wire and the temperature compensating resistor can be made of a same material and have a same resistance value, which is advantageous not only from the manufacturing standpoint but also in respect that the temperature characteristics of the hot wire and the temperature compensating resistor can be matched to each other. Further, since the constant current sources are provided separately for the hot wire and the temperature compensating resistor, the spontaneous heat generation of the latter can be substantially suppressed by using a current source which is adapted to supply the constant current $I_K$ of small magnitude to the temperature compensating resistor.

Figure 3:
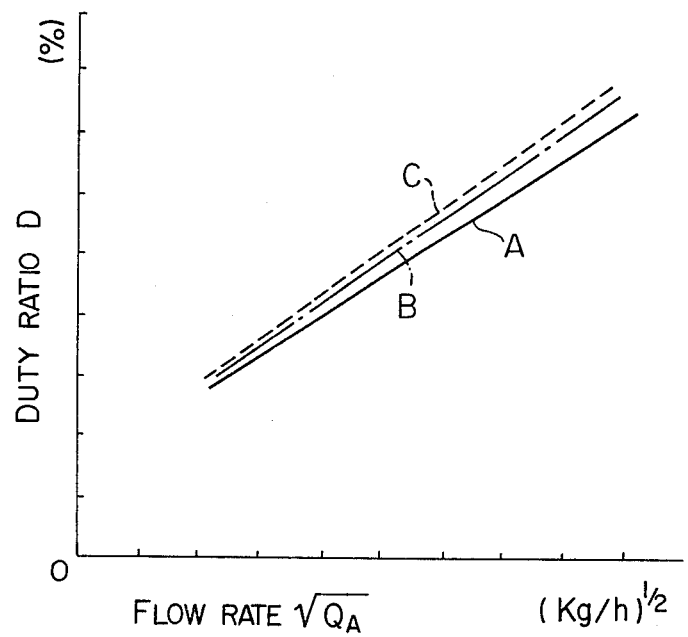
FIG. 3 graphically illustrates relationships between a duty ratio and an air flow rate with air temperature being used as a parameter.

FIG. 3 graphically illustrates how the characteristic relationship between the duty ratio and the squared air flow $\sqrt{Q_A}$ varies in dependence on the temperature of air. In this figure, a curve A represents the characteristic relationship at the air temperature of 28° C., a curve B represents the relation at the air temperature of 48° C., and a curve C represents the relation at 68° C. The reason why the duty ratio should take different values at the same air flow rate can be explained by the fact that the heat transfer coefficient exhibits a temperature dependency.

Figure 4:
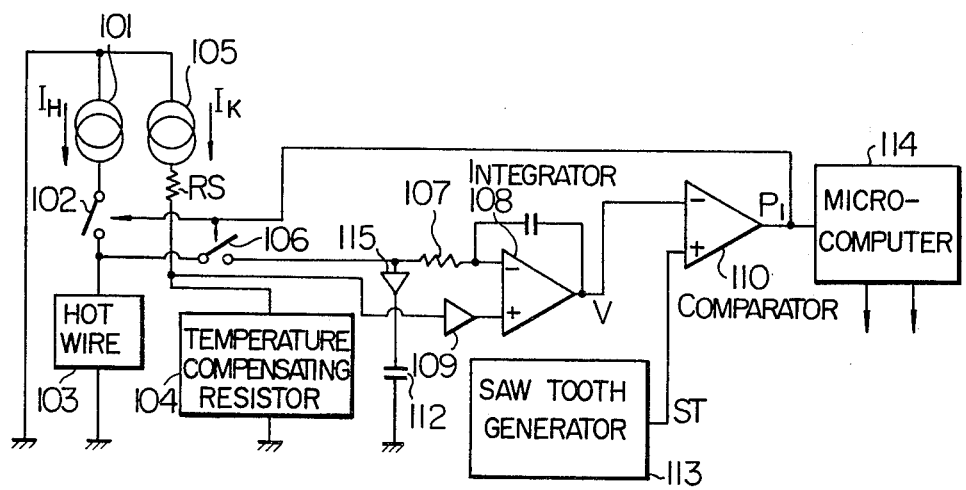
FIG. 4 shows in a block diagram a version of the apparatus shown in FIG. 2.

FIG. 4 shows a circuit arrangement with which it is intended to compensate the temperature dependency described above. The arrangement shown in FIG. 4 differs from the one shown in FIG. 2 in that a resistor RS is connected in series to the temperature compensating resistor 104. In FIG. 4, the elements same as or equivalent to those shown in FIG. 2 are denoted by the same reference numerals.

Referring to the expression (10), when $$K_1 = \frac{1}{R_{HO} \cdot \alpha}\left(1 - \frac{R_{HO} \cdot I_H}{K \cdot R_{KO} \cdot I_K}\right) \quad (11)$$

then $$C_1 = \frac{4.2}{I_H^2} \cdot K_1 \cdot c_1 \quad (12)$$

$$C_2 = \frac{4.2}{I_H^2} \cdot K_1 \cdot c_2 \quad (13)$$

Since the resistor RS is connected in series to the temperature compensating resistor (RK) 104, the expression (11) is rewritten as follows:

$$K_1 = \frac{1}{R_{HO} \cdot \alpha}\left[1 - \frac{R_{HO} \cdot I}{K \cdot R_{KO} \cdot I_K}\left(1 - \frac{1}{1 + \frac{R_{KO}}{R_S}(1 + \alpha \cdot T_a)}\right)\right] \quad (14)$$

where $R_S$ represents the resistance value of the series resistor RS.

As can be seen from the above analysis, the quantity $K_1$ exhibits a negative temperature coefficient relative to the air temperature $T_a$ due to the series connection of the resistor RS. Thus, the heat transfer coefficient exhibiting a positive temperature coefficient can be corrected by providing the series resistor RS in the manner shown in FIG. 4.

Figure 5:
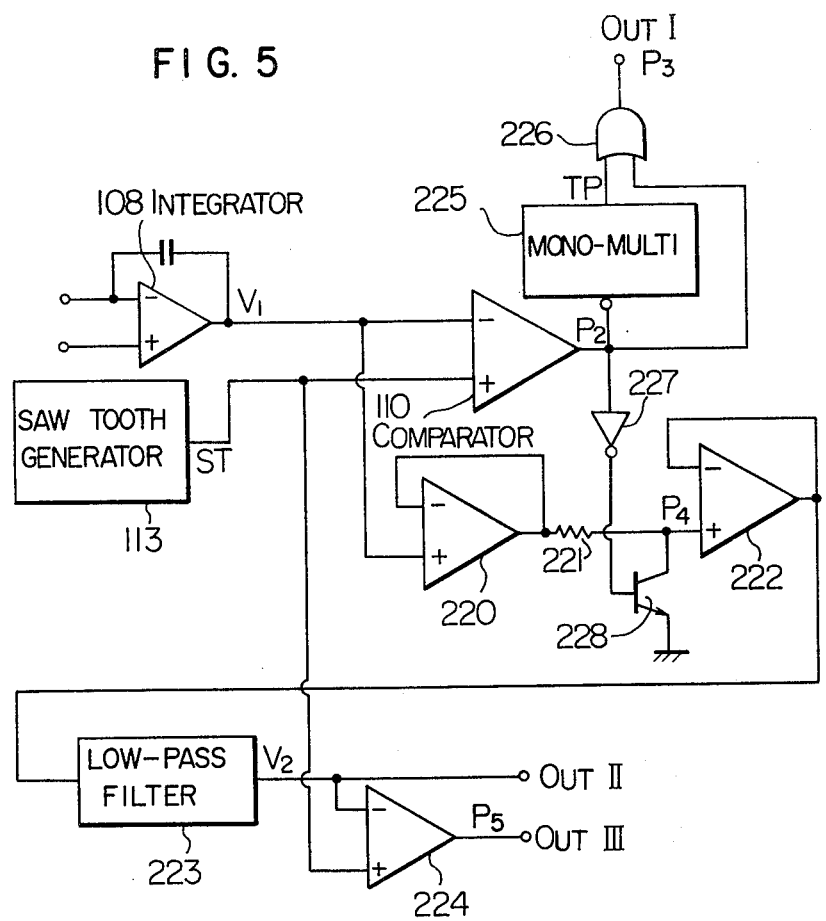
FIG. 5 shows in a block diagram a hot-wire type flow sensor driving apparatus which is provided with a signal processing circuit for reducing a processing load imposed on an electronic computer according to another embodiment of the invention.
Figure 7:
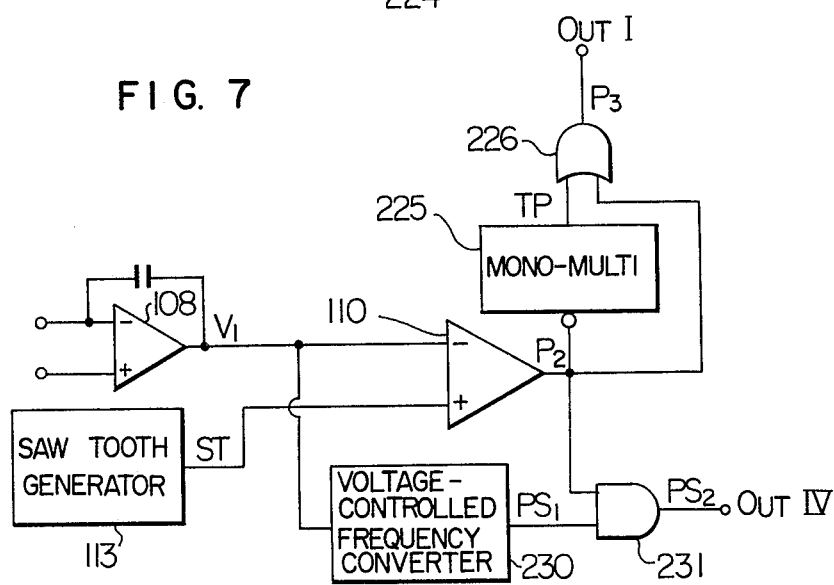
FIG. 7 shows in a block diagram a modification of the apparatus shown in FIG. 5.

FIGS. 5 and 7 in which circuit elements same as or equivalent to those shown in FIG. 2 are denoted by the same reference numerals show further embodiments of the invention which are intended to reduce the processing load imposed on the electronic computer by providing a circuit for increasing the duty ratio in the sensor driving system.

Referring to FIG. 5, the output of the integrator 108 which is identical with the corresponding one shown in FIG. 2 is connected to a positive (plus) input terminal of an amplifier 220 having a negative (minus) input terminal to which the output terminal of the same amplifier 220 is connected. Further, the output terminal of the amplifier 220 is connected to a positive input terminal of a buffer amplifier 222 through a resistor 221. The output terminal of the buffer amplifier 222 is connected to the negative input terminal thereof and at the same time connected to a negative input terminal of a comparator 224 through a low-pass filter 223. The comparator 224 has a positive input terminal connected to the output of the saw tooth generator 113.

On the other hand, the output terminal of the comparator 111 is connected to a one-shot multivibrator 225 having an output terminal connected to one input terminal of an OR-circuit 226. The other input terminal of the OR circuit 226 is connected to the output terminal of the comparator 110. Further, an inverter 227 is connected to the output of the comparator 110, while the output terminal of the inverter 227 is connected to a base electrode of a transistor 228 which has a collector connected to the resistor 221 and an emitter connected to the ground.

With the circuit arrangement described above, a D.C. voltage $V_1$ such as illustrated in FIG. 6a at (C) produced from the integrator circuit 108 is applied to the negative input terminal of the comparator 110. The positive input terminal of the comparator 110 is supplied with the saw tooth voltage ST having a predetermined constant period. The comparator 110 thus compares the D.C. voltage $V_1$ output from the integrator circuit 108 with the saw tooth voltage ST to thereby produce a pulse signal $P_2$ having a duty ratio $T_2/T_1$ as illustrated in FIG. 6a at (D). The pulse signal $P_2$ (FIG. 6a, (D)) is applied to the one input terminal of the OR circuit 226. Further, in response to the rise-up of the output pulse $P_2$ from the comparator 110, the one-shot multivibrator 225 produces a trigger pulse TP having a pulse width $t_1$, as illustrated in FIG. 6a a (E). The trigger pulse TP is applied to the other input terminal of the OR circuit 226. As the consequence, a pulse signal $P_3$ having a duty ratio $T_2'/T$ such as shown in FIG. 6a at (F) is produced from the OR circuit 226. This pulse signal $P_3$ is labelled OUT I and utilized for operating the semiconductor switches 102 and 106 to supply currents to the hot wire 103 and the temperature compensating resistor 104 shown in FIG. 2.

The pulse signal $P_3$ is inherently equivalent to the pulse signal $P_1$ for operating the semiconductor switches 102 and 106 in the system shown in FIG. 2. In other words, assuming that the engines provided with the sensor driving systems shown in FIGS. 2 and 5, respectively, are of the same type and operated at the same revolution number, the pulse signals $P_1$ and $P_3$ applied to the respective semiconductor switches 102 are intrinsically equivalent or equal to each other. Comparison of the pulse signal $P_2$ output from the comparator 110 shown in FIG. 5 with the pulse signal $P_1$ produced from the corresponding comparator 110 of the system shown in FIG. 2 will indicate that the duration $T_2$ of the pulse signal $P_2$ available in the sensor driving system shown in FIG. 5 is shorter than the duration $T_1$ of the pulse $P_1$ used in the system shown in FIG. 2 by a time interval $t_1$, as illustrated in FIG. 6a at (B), (D) and (E). In this connection, when the term $C_1$ of the expression $D=C_1+C_2\sqrt{Q_A}$ is so selected as to correspond to $t_1$, then the output signal $V_1$ from the integrator 108 and as well as the output pulse from the comparator 110 in the sensor driving system shown in FIG. 5 correspond to the term $C_2\sqrt{Q_A}$ of the above expression, respectively.

Figure 1:
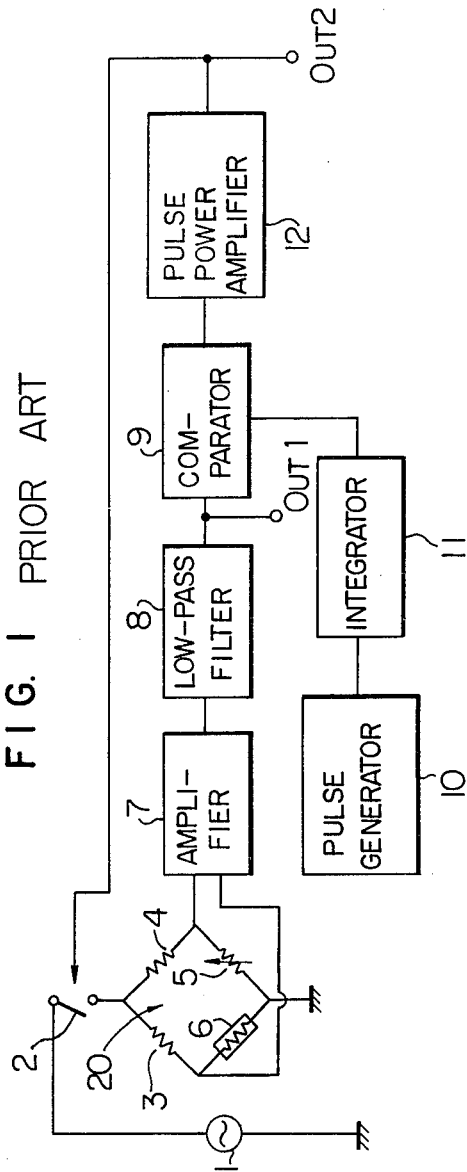
FIG. 1 shows in a block diagram an arrangement of an apparatus for driving a hot-wire type air-flow sensor according to the prior art.

In this manner, in the case of the sensor driving system shown in FIG. 1 in which the one-shot multivibrator 225 is provided, the output signals from the integrator circuit 108 and the comparator 110 represent only the term $C_2\sqrt{Q_A}$. This means that the subtracting operation of $(D-C_1)$ is executed in the sensor driving system shown in FIG. 5 without the aid of the electronic computer which can thus be used for other arithmetic processings at a correspondingly increased speed.

Figure 6B:
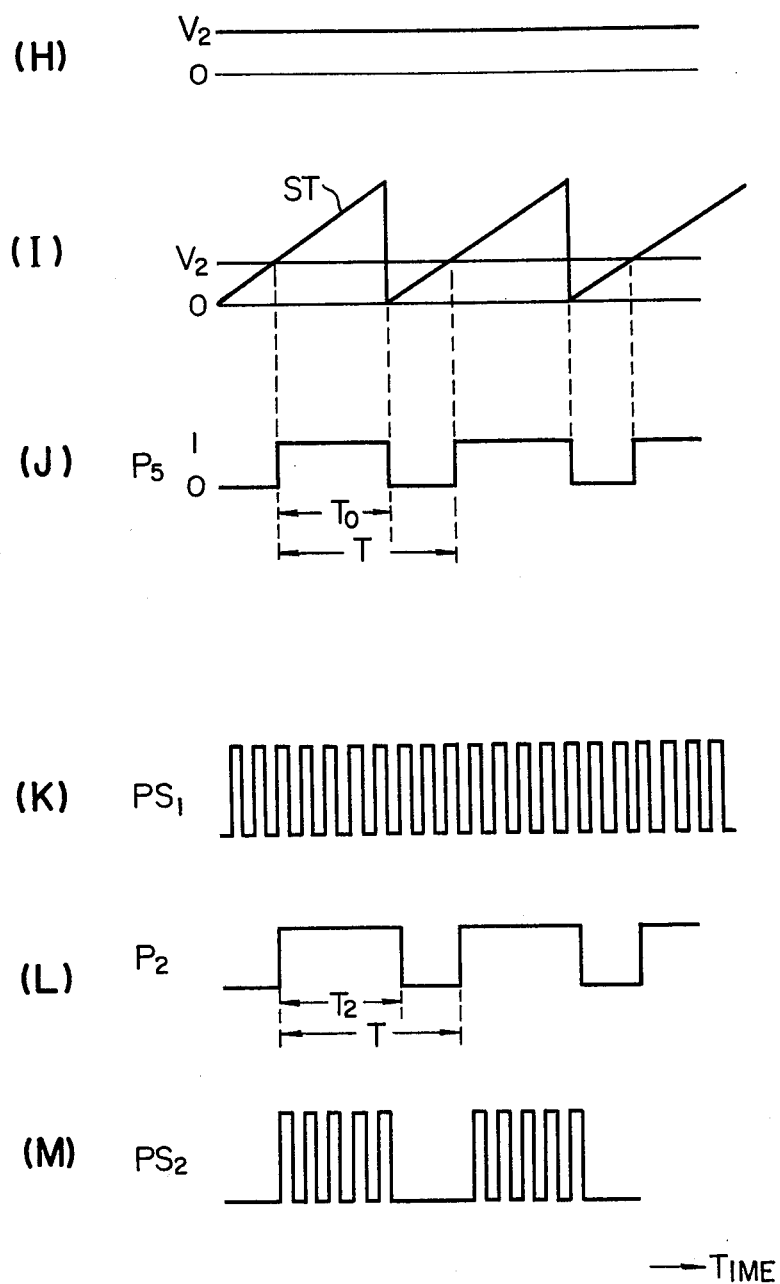

In the meantime, the D.C. voltage signal $V_1$ (FIG. 6a, (C)) produced from the integrator circuit 108 is applied to the positive input terminal of the amplifier 220 and hence to the buffer amplifier 222 through the resistor 221. In this connection, it should be noted that the D.C. voltage $V_1$ produced from the integrator circuit 108 is not straightly supplied to the buffer amplifier 222. More particularly, since the output pulse signal $P_2$ (FIG. 6a, (D)) produced from the output of the comparator 110 is inverted through the inverter 227 and applied to the base of the transistor 228, the positive input terminal of the buffer amplifier 222 is supplied with a pulse signal $P_4$ having a voltage level $V_1$ and a duty ratio $T_2/T$, as is illustrated in FIG. 6a at (G). The pulse signal $P_4$ output from the buffer amplifier 222 is smoothed through the low-pass filter 223, whereby a D.C. voltage signal $V_2$ such as shown in FIG. 6b at (H) is obtained and taken out as an analog signal from the output terminal labelled OUT II.

The output voltage signal $V_2$ corresponds, so to speak, to a product of the crest value $V_1$ and the duration $T_2$ of the pulse $P_4$ shown in FIG. 6a at (G). Since the value $V_1$ and the duration $T_2$ of the pulse $P_2$ correspond to the term $C_2\sqrt{Q_A}$, as described hereinbefore, the signal $P_4$ represents the square of $C_2\sqrt{Q_A}$, i.e. the air flow rate itself which need not be squared.

In this manner, there can be derived from the output terminal OUT II the signal representing straightly the air flow rate without the aid of electronic computer, which signal can be made use of directly by the latter.

Further, the D.C. voltage $V_2$ output from the low-pass filter 223 may be compared with the saw tooth voltage ST produced from the saw tooth generator 113 through the comparator 224 in a manner illustrated in FIG. 6b at (I) thereby to produce a pulse signal $P_5$ having a duty ratio $T_o/T$ such as shown in FIG. 6b at (J). The pulse signal $P_5$ can be derived from the terminal OUT III to be supplied to the microcomputer.

In this manner, there can be obtained from the output terminal OUT III a pulse signal having a pulse width which is determined in dependence on the analog signal $V_2$. On the other hand, by arithmetically determining the pulse width $T_o$ of the pulse signal $P_5$ or the number of pulses occurring in a predetermined time span in the microcomputer, a square root of the air flow rate can be obtained.

Referring to FIG. 7 which shows a further embodiment of the invention and in which circuit elements having same functions as those shown in FIGS. 2 and 5 are denoted by the same reference numerals, a voltage-controlled frequency converter 230 is connected to the output of the integrator circuit 108 in place of the analog output circuit for producing the analog signal representative of the air flow rate $Q_A$ and the circuit for producing the signal representative of the duty ratio. The output terminal of the converter 230 is connected to one input terminal of an AND circuit 231 which has the other input terminal connected to the output of the comparator.

With the circuit arrangement shown in FIG. 7, the D.C. voltage $V_1$ (FIG. 6a, C) produced from the integrator circuit 108 is converted into a pulse signal $PS_1$ of predetermined frequency illustrated in FIG. 6b at (K). This pulse signal $PS_1$ is applied to the AND circuit 231 which in turn produces a signal $PS_2$ (FIG. 6b, M) at the output terminal OUT IV in dependence on the signal (FIG. 6a, C or L) produced from the comparator 110 and representing the duty ratio. With the aid of the microcomputer, the air flow rate can be determined by counting the number of pulses $PS_2$ during a sample and hold time, since the number of pulses $PS_2$ is in proportion to the air flow rate.

Figure 8:
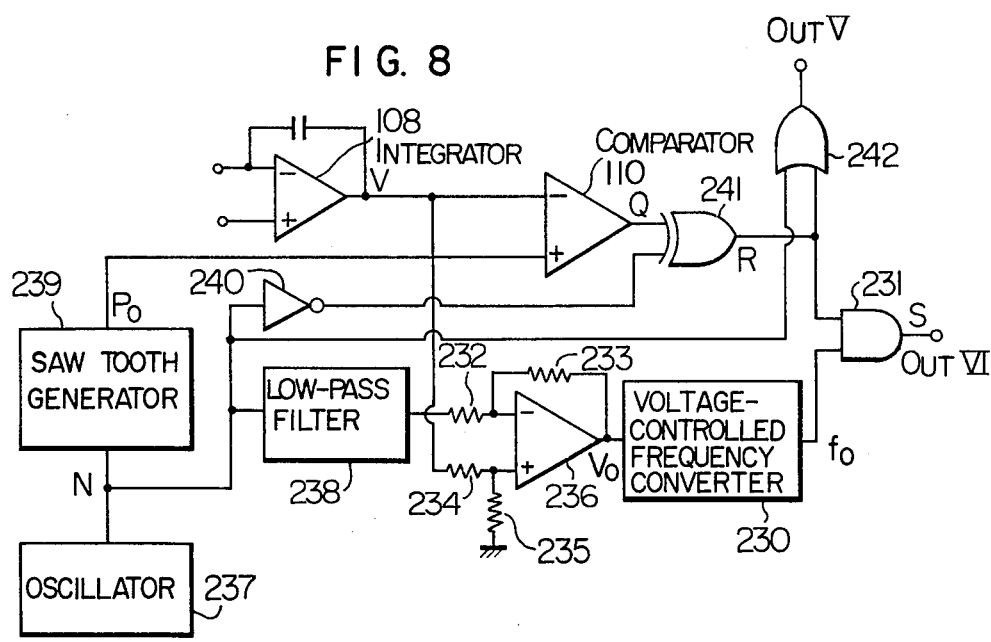
FIG. 8 shows in a block diagram a hot-wire type air-flow sensor driving apparatus provided with a signal processing apparatus for reducing a processing load imposed on an electronic computer according to still another embodiment of the invention.

Referring to FIG. 8 which shows still another embodiment of the invention and in which the same or like elements as those shown in FIGS. 2 and 4 are denoted by the same reference symbols, the output terminal of the integrator circuit 108 is connected to one input terminal of a subtraction circuit composed of resistors 232, 233, 234 and 235 and an operational amplifier 236. Additionally, the other input terminal of the subtraction circuit is connected to the output terminal of a low-pass filter 238, while the output terminal of the subtraction circuit is connected to the voltage-controlled frequency converter 230. The output of an oscillator 237 is coupled to the inputs of a saw tooth generator circuit 239, the low-pass filter 238, and an inverter 240, respectively, and to one input of a two-input OR circuit 242. The output terminal of the saw tooth generator 239 is connected to a positive or plus input terminal of the comparator 110, while the output of the inverter 240 is connected to one input terminal of an Exclusive-OR circuit 241 which has the other input terminal connected to the output terminal of the comparator 110 and an output terminal coupled to the other inputs of the OR circuit 242 and the AND circuit 231, respectively.

The operations of the apparatus shown in FIG. 8 will be described below by referring to a signal waveform diagram shown in FIG. 9.

The integrator 108 produces a D.C. voltage signal V such as shown in FIG. 6a at (A) which can be given by the expression $V \propto C_1 + C_2\sqrt{Q_A}$ and thus contains the term $C_1$. Accordingly, it is necessary to eliminate the term or component $C_1$ in order to obtain the final output signal which is directly in proportion to $Q_A$. Two examples of the means for eliminating the term $C_1$ have been described in conjunction with FIGS. 5 and 7. According to the embodiment shown in FIG. 8, a pulse signal N having a pulse width or duration $t_2$ which corresponds to the term $C_1$, as shown in FIG. 9 at (A), is produced from the oscillator 237. The pulse signal N has a duty ratio of $t_2/T$. By smoothing the pulse signal N through the filter 238, a D.C. voltage V' which is equivalent to $t_2$ and hence to $C_1$ is obtained. In other words, the voltage V" is in proportion to the duration $t_2$ of the pulse N. Therefore, the output voltage $V_o$ from the subtraction circuit corresponds to the term $C_2\sqrt{Q_A}$ and is converted into a pulse signal $f_o$ of a predetermined frequency (shown in FIG. 9 at B) through the frequency converter 230 to be applied to the AND circuit 231. The relation between $f_o$ and $Q_A$ can be given by the expression $f_o \propto C_2\sqrt{Q_A}$.

Figure 9:
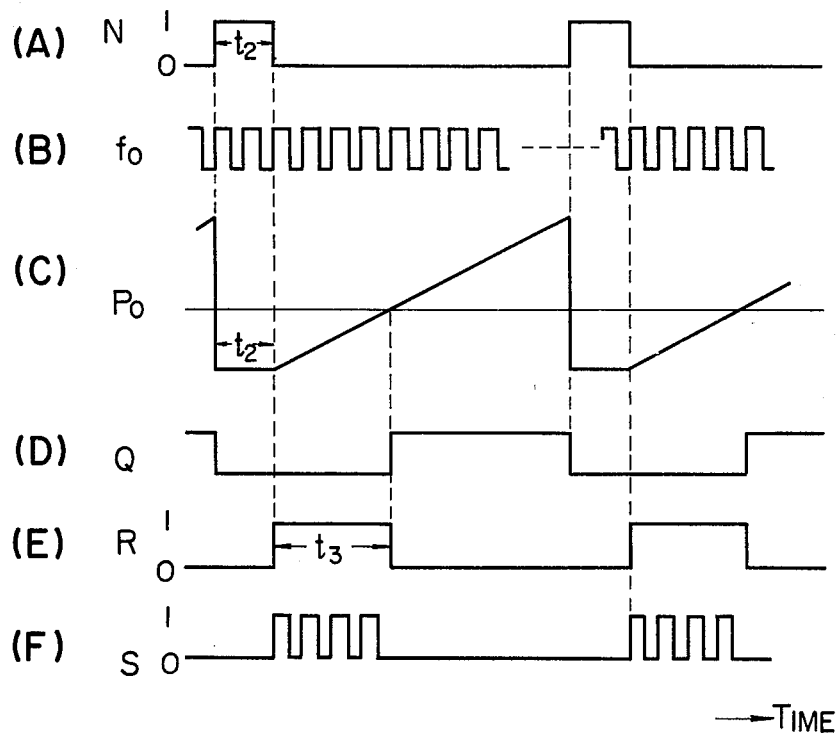
FIG. 9 is a signal waveform diagram to illustrate operation of the apparatus shown in FIG. 8.

On the other hand, the plus input terminal of the comparator 110 is applied with a saw tooth voltage signal $P_o$ which is at zero level during the duration $t_2$ of the output signal N from the oscillator 237 and rises up in synchronism with the beginning of the duration $t_2$, as is illustrated in FIG. 9 at (C). The comparator 110 thus serves to compare this signal $P_o$ with the output voltage V from the integrator circuit 108, whereby a signal Q having the duty ratio which is in proportion to the quantity $C_1 + C_2\sqrt{Q_A}$, as shown in FIG. 9 at (D), is produced from the comparator 110. When the duration $t_2$ corresponding to the term $C_1$ is subtracted from the pulse width of the signal Q, there can be produced from the output of the Exclusive-OR circuit 241 a pulse signal R having a pulse duration $t_3$ corresponding to the term $C_2\sqrt{Q_A}$, as is illustrated in FIG. 9 at (E). This pulse signal R is then supplied to the AND circuit 231.

There can be obtained from the output terminal OUT VI of the AND circuit 231 a pulse signal S shown in FIG. 9 at (F). By counting the number of the pulses of this signal S over a predetermined sample and hold period, the air flow rate which is in proportion to the counted number of pulses can be determined.

We claim:

1. An apparatus for driving a hot-wire type air-flow sensor, comprising a hot wire disposed so as to radiate heat into an air flow; a temperature sensitive compensating element for temperature compensation; constant current supply sources for supplying constant currents to said hot wire and said temperature sensitive compensating element, respectively; electronic switch means for interrupting the constant current supplied to said hot wire from said constant current supply source; sample and hold means for sampling and holding a terminal voltage appearing across said hot wire when said constant current is being supplied thereto; integrating means for integrating a difference voltage between a terminal voltage produced across said temperature sensitive compensating element and the output voltage from said sample and hold means; and duty ratio determining means adapted to produce a train of pulses having a pulse width corresponding to the output voltage of said integrating means, wherein said electronic switch means are controlled by the pulse train produced from said duty ratio determining means.

2. An apparatus according to claim 1, wherein said hot wire and said temperature sensitive compensating element are constituted by resistance elements made of a same material and having a substantially same resistance value.

3. An apparatus according to claim 1, wherein an additional resistor is connected in series to said temperature sensitive compensating element.

4. An apparatus according to claim 1, wherein said sample and hold means includes a series connection of a buffer amplifier and a capacitor, said series connection being connected in parallel with said hot wire.

5. An apparatus according to claim 1, wherein said duty ratio determining means comprises a comparator having one input for receiving the output signal from said integrating means and a saw tooth generator for producing a saw tooth signal which is applied to the other input of said comparator.

6. An apparatus for driving a hot-wire type air-flow sensor, comprising a hot wire disposed so as to radiate heat into an air flow; a temperature sensitive compensating element for temperature compensation; constant current supply sources for supplying constant currents to said hot wire and said temperature sensitive compensating element, respectively; electronic switch means for interrupting the constant current supplied to said hot wire from said constant current supply source; sample and hold means for sampling and holding a terminal voltage appearing across said hot wire when said constant current is being supplied thereto; integrating means for integrating a difference voltage between a terminal voltage produced across said temperature sensitive compensating element and the output voltage produced from said sample and hold means; duty ratio determining means adapted to produce a train of pulses having a pulse width corresponding to the output voltage of said integrating means, said duty ratio determining means including a circuit for increasing said pulse width, wherein said electronic switch means are controlled by said pulse train produced from the output of said duty ratio determining means.

7. An apparatus according to claim 6, wherein said duty ratio determining means includes a comparator having one input for receiving the output signal from said integrating means, a saw tooth generator for producing a saw tooth signal applied to the other input of said comparator, a one-shot multivibrator connected to the output of said comparator, and an OR circuit for receiving at inputs thereof the output signal from said one-shot multivibrator and the output signal from said comparator thereby to produce a logical sum signal at the output.

8. An apparatus according to claim 7, further including a circuit for producing from the output voltage signals produced from said integrating means and said comparator, respectively, an output pulse signal having a duty ratio equal to that of the pulse signal output from said comparator and a crest value equal to that of the output voltage from said integrating means and a smoothing circuit for smoothing said output pulse signal.

9. An apparatus according to claim 8, further including a comparator having one input terminal for receiving the output signal from said smoothing circuit and the other input terminal for receiving the output signal from said saw tooth generator circuit thereby to produce a pulse output signal having a pulse width corresponding to the output signal from said smoothing circuit.

10. An apparatus according to claim 7, further including a voltage-controlled frequency converter for producing a frequency corresponding to the output voltage from said integrating means, and an AND circuit for producing a logical product of the output signals produced from said comparator and said frequency converter, respectively.

11. An apparatus for driving a hot-wire type air-flow sensor, comprising a hot wire disposed so as to radiate heat into an air flow; a temperature sensitive compensating element for temperature compensation; constant current supply sources for supplying constant currents to said hot wire and said temperature sensitive compensating element, respectively; electronic switch means for interrupting the constant current supplied to said hot wire from said constant current supply source; sample and hold means for sampling and holding a terminal voltage appearing across said hot wire when said constant current is being supplied thereto; comparing means for comparing a terminal voltage produced across said temperature sensitive compensating element with the output signal from said sample and hold means; and duty ratio determining means adapted to produce a train of pulses having a pulse width corresponding to the output voltage of said comparing means, said electronic switch means being controlled by said pulse train produced from said duty ratio determining means, wherein said duty ratio determining means includes a comparator having one input for receiving the output signal from said integrating means, an oscillator for producing a pulse signal having a predetermined pulse width, and a saw tooth generator for producing a saw tooth signal having a rest interval corresponding to said predetermined pulse width, the output signal from said saw tooth generator being applied to the other input of said comparator.

12. An apparatus according to claim 11, further including a first circuit for subtracting the output signal of said oscillator from the output signal of said comparator, a second circuit for subtracting the output signal of said oscillator from the output signal of said integrating means, and a circuit for determining a product of the output signals produced from said first and second subtraction circuit.

* * * * *